(12) United States Patent
Lin

(10) Patent No.: US 7,455,322 B2
(45) Date of Patent: Nov. 25, 2008

(54) BUFFER DEVICE FOR VEHICLE SEAT BELT

(76) Inventor: Cadmus Lin, 1FL., No. 2, Alley 11, Lane 58, Gongyecyu 1st Rd., Situn Dist., Taichung City 407 (TW)

( * ) Notice: Subject to any disclaimer, the term of this patent is extended or adjusted under 35 U.S.C. 154(b) by 321 days.

(21) Appl. No.: 11/481,876

(22) Filed: Jul. 7, 2006

(65) Prior Publication Data

US 2007/0007381 A1 Jan. 11, 2007

(30) Foreign Application Priority Data

Jul. 8, 2005 (CN) .................... 2005 1 0083525

(51) Int. Cl.
*B60R 22/28* (2006.01)

(52) U.S. Cl. .................. 280/805; 297/470; 297/471; 188/135

(58) Field of Classification Search .............. 280/801.1, 280/808, 805; 188/470, 471; 297/470, 471; *B60R 22/28*
See application file for complete search history.

(56) References Cited

U.S. PATENT DOCUMENTS 3,292,744 A * 12/1966 Replogle .................. 188/135
3,371,960 A * 3/1968 Bayer et al. .................. 297/470
3,400,977 A * 9/1968 Jones .......................... 297/470
6,183,014 B1 * 2/2001 Kruger ........................ 280/805

FOREIGN PATENT DOCUMENTS

DE 3829982 A1 * 3/1989
JP 5-270358 A * 10/1993

* cited by examiner

*Primary Examiner*—Ruth Ilan
(74) *Attorney, Agent, or Firm*—Browdy and Neimark P.L.L.C.

(57) ABSTRACT

A buffer device for vehicle seat belt includes a housing having two inside racks, a roller assembly, which has a roller and two gearwheels fixedly provided at the ends of the roller and meshed with the racks for guiding rotation of the roller along the racks, a traction cord member, which has a first end connected to the roller and is pullable by the seat belt such that the roller is forced to rotate along the racks to roll up the traction cord member when the seat belt is stretched to pull the roller upon an impact force, and a spring member connected between the housing and the roller for rebounding the roller to a former position.

8 Claims, 5 Drawing Sheets

BUFFER DEVICE FOR VEHICLE SEAT BELT

BACKGROUND OF THE INVENTION

1. Field of the Invention

The present invention relates to a seat belt for motor vehicle and more particularly, to a buffer device for a vehicle seat belt.

2. Description of the Related Art

In order to protect passengers in a motor vehicle against injury upon an impact, safety means such as pretensioner car body, seat belts, air bags, and etc. may be provided in the motor vehicle. Seat belts are popularly used in motor vehicles to secure passengers to the seats. A seat belt in a motor vehicle works to provide a first line of protection. A vehicle seat belt generally has three fixed points respectively disposed at two sides beneath the seat and a top side above the passenger's shoulders. After fixation to the three points, the seat belt can be extended over the front side of the pelvis and the front side of the chest of the passenger. The seat belt secures the passenger to the seat against the inertia force of the motor vehicle upon an impact force, preventing the passenger from hitting the windshield glass or something in front of the seat.

However, if the motor vehicle is crushed by another motor vehicle or hits another motor vehicle when running at a high speed, a high inertia force will be produced, and the passenger will cause a relatively greater impact force to the seat belt, causing the seat belt to produce a relatively greater reactive force to the passenger. In this case, the seat belt will give a high pressure to the passenger to prohibit the passenger from falling out of the seat. This high pressure may result in an injury to the passenger.

Therefore, it is desirable to provide a buffer device for vehicle seat belt that eliminates the aforesaid problem.

SUMMARY OF THE INVENTION

The present invention has been accomplished under the circumstances in view. It is therefore the main object of the present invention to provide a buffer device for a vehicle seat belt, which lessens the reactive force applied by the seat belt to the passenger upon an impact, preventing injury of the passenger by the seat belt.

To achieve this object of the present invention, the buffer device used in a motor vehicle and connected to a seat belt in the motor vehicle for buffering the seat belt upon an impact force comprises a housing mounted therein with at least one rack having a first end and a second end. A roller assembly has a roller with at least one engagement portion meshed with the at least one rack for guiding rotation of the roller along the at least one rack. A traction cord member has an end connected to the roller. The traction cord member is pullable by movement of the seat belt such that when the seat belt is stretched to pull the roller upon an impact force, the roller is forced to rotate along the at least one rack toward the first end of the rack to roll up the traction cord member thereon. A spring member is connected between the housing and the roller for pulling the roller assembly toward the second end of the rack. When the seat belt receives an impact force, the impact force is transferred through the traction cord member and the roller assembly to the spring member such that the impact force is converted to a rebounding potential energy of the spring member, which pulls the roller assembly to move toward the second end of the rack when the impact force is eliminated.

In a preferred embodiment of the present invention, the traction cord member has the other end fixed to the housing. A bearing device is movably provided inside the housing and connected to the beat belt. The traction cord member has a middle portion passing over the bearing device such that the traction cord member is pulled by the seat belt through the bearing device.

In another embodiment of the present invention, the other end of the traction cord member is connected to the seat belt such that the traction cord member is directly pullable by the seat belt.

DETAILED DESCRIPTION OF THE INVENTION

Figure 1:
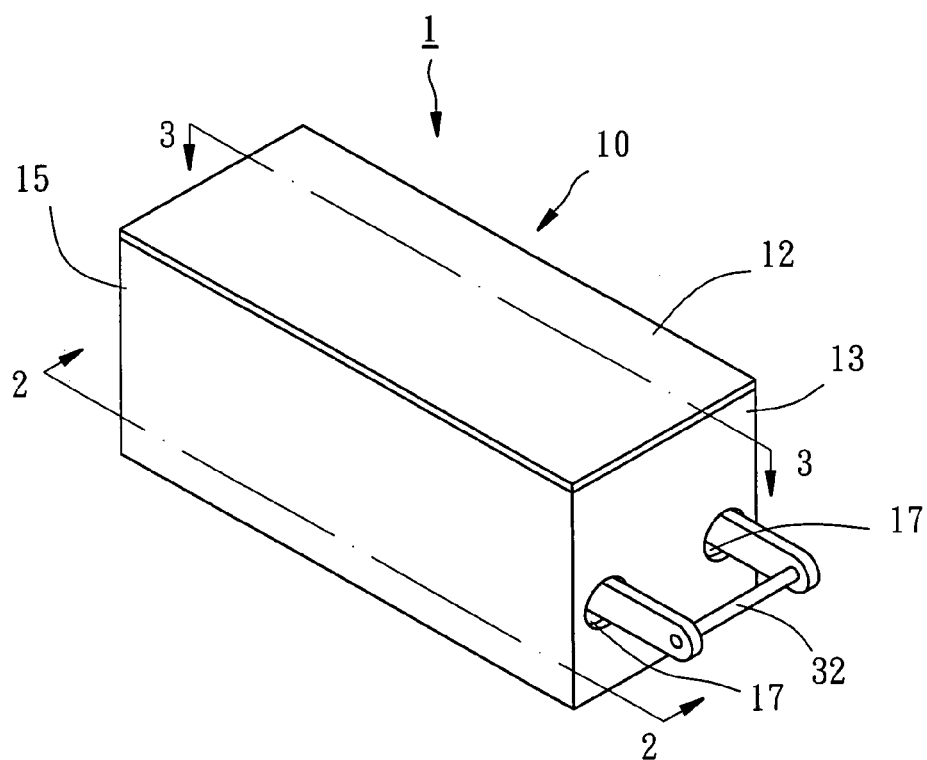
FIG. 1 is a perspective view of a buffer device for vehicle seat belt according to a preferred embodiment of the present invention.
Figure 2:
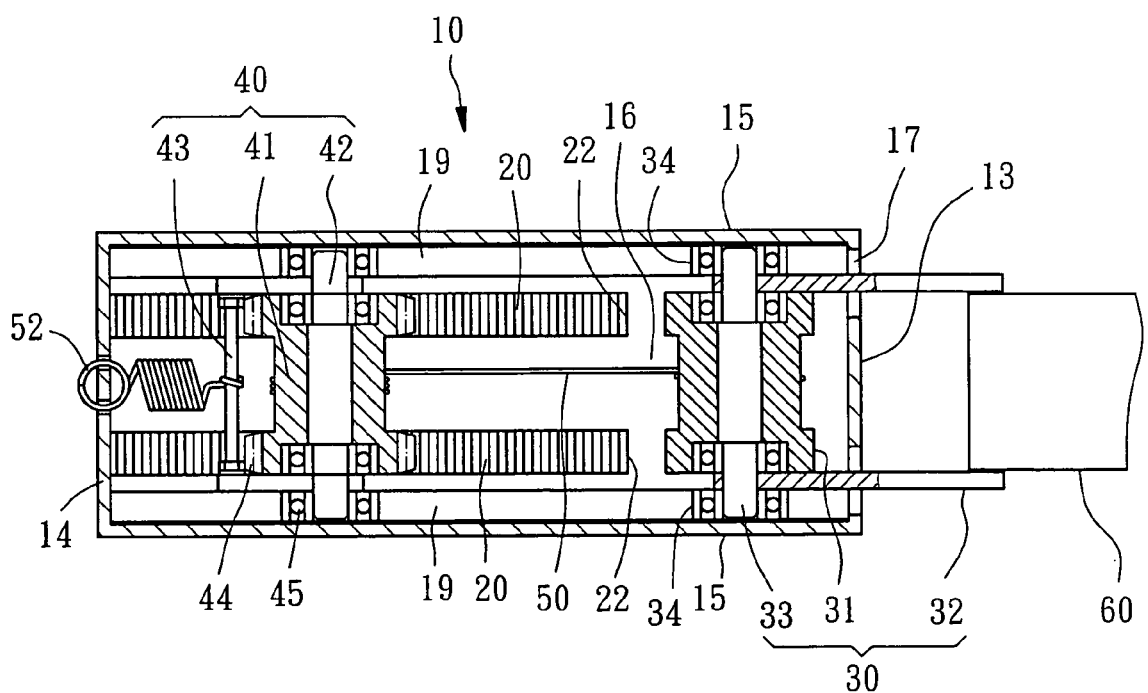
FIG. 2 is a sectional view taken along line 2-2 of FIG. 1.
Figures 3, 4:
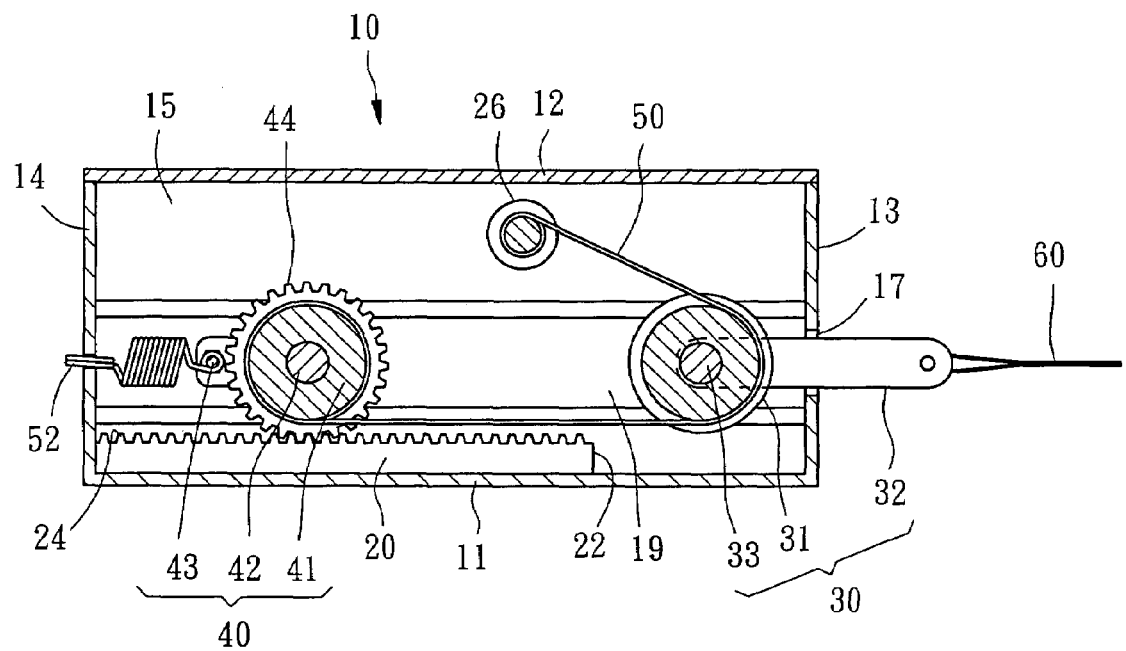
FIG. 3 is a sectional view taken along line 3-3 of FIG. 1.
FIG. 4 is a schematic sectional top view of the present invention, showing the roller assembly moved to a position close to the second ends of the racks.

As shown in FIGS. 1-4, a buffer device 1 in accordance with a preferred embodiment of the present invention comprises a housing 10, a bearing device 30, a roller assembly 40, a traction cord member 50, and a spring member 52.

The housing 10 has a bottom panel 11, a top panel 12, a front panel 13, a back panel 14 and two opposite side panels 15, defining an accommodation chamber 16. The front panel 13 has two through holes 17. The two side panels 15 each have a straight sliding groove 19 extending between the front and rear sides on the respective inner wall that faces the accommodation chamber 16. The bottom panel 11 has two racks 20 fixedly mounted on the top surface that faces the accommodation chamber 16. The racks 20 each have a first end 22 and a second end 24. The housing 10 further has a locating portion 26 spaced between the two side panels 15 above the elevation of the sliding grooves 19.

The bearing device 30 comprises a roller 31, a U-shaped frame 32, and an axle 33. The roller 31 is suspending between two opposite lateral sides of the U-shaped frame 32. The axle 33 is inserted through the two opposite lateral sides of the U-shaped frame 32 and the center of the roller 31 to support the roller 31 in the U-shaped frame 32, having two axle bearings 34 respectively mounted on the two distal ends. The U-shaped frame 32 has the front side suspending outside the front panel 13 of the housing 10 for the connection of a seat belt 60. The two opposite lateral sides of the U-shaped frame 32 are respectively inserted through the through holes 17 of the front panel 13. The axle bearings 34 are respectively coupled to the sliding grooves 19 for allowing movement of the bearing device 30 along the sliding grooves 19 and rotation of the roller 31 on the axle 33 when the seat belt 60 is stretched.

The roller assembly 40 comprises a roller 41, an axle 42, and a U-shaped frame 43. The roller 41 is suspending between two opposite lateral sides of the U-shaped frame 43, having two engagement portions 44, for example, two wheel-like gear portions 44 respectively disposed at the two distal ends and respectively meshed with the rack 20 in the housing 10. The diameter of the roller 41 is smaller than the diameter of the engagement portions 44. The axle 42 is inserted through the two opposite lateral sides of the U-shaped frame 43 and the center of the roller 41 to support the roller 41 in the U-shaped frame 43, having two axle bearings 45 respectively mounted on the two distal ends and respectively coupled to the sliding grooves 19 of the housing 10. Therefore, the roller assembly 40 can be moved along the sliding grooves 19 and the racks 20, and the roller 41 can be rotated on the axle 42 relative to the U-shaped frame 43.

The traction cord member 50 has one end fastened to the locating portion 26 in the housing 10, and the other end extending over the roller 31 of the bearing device 30 to the bottom side of the roller 31 and wound around and affixed to the periphery of the roller 41 of the roller assembly 40.

The spring member 52 according to this embodiment is a tensile spring, having one end fastened to the back panel 14 and the other end connected to the U-shaped frame 43 of the roller assembly 40. The spring member 52 imparts a spring force to pull the roller assembly 40 toward the second ends 24 of the racks 20.

Figure 5:
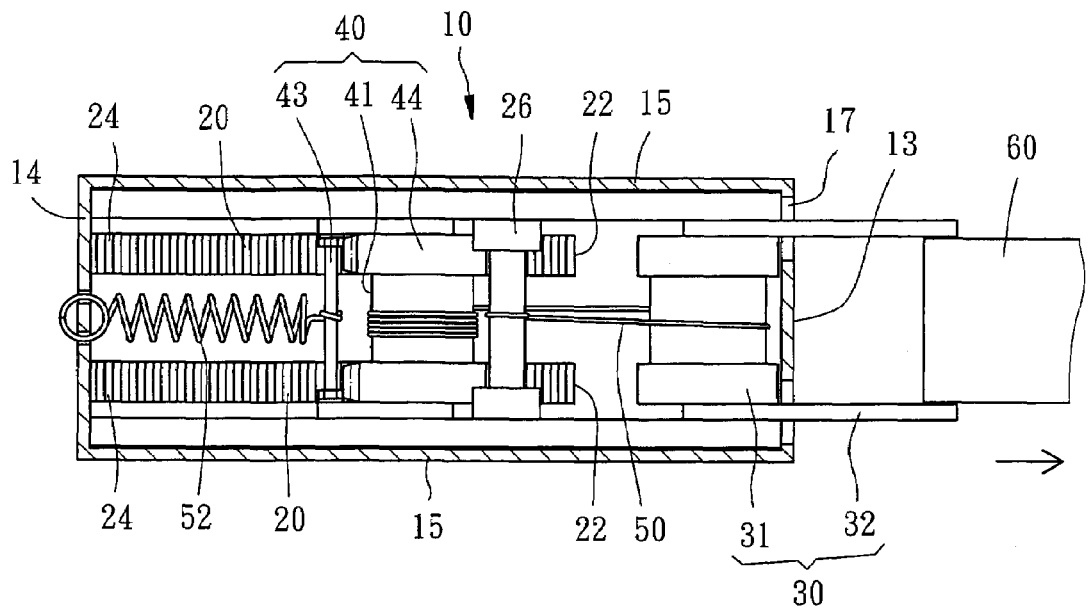
FIG. 5 is a schematic sectional top view of the present invention, showing the roller assembly moved to a position close to the first ends of the racks.
Figure 6:
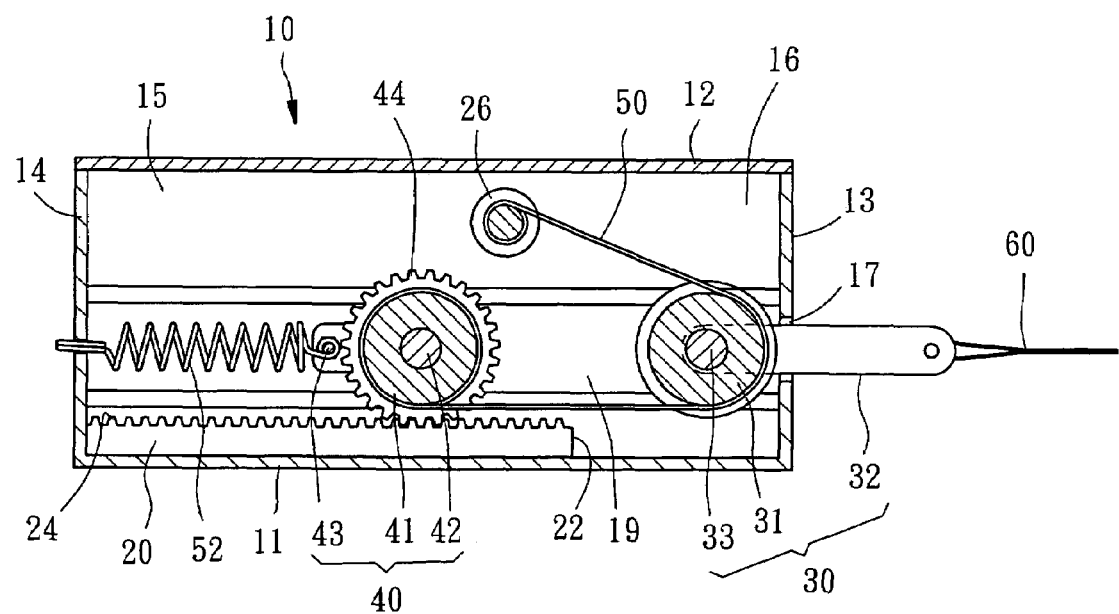
FIG. 6 is a schematic sectional side view of FIG. 5.

Referring to FIGS. 5 and 6, when the seat belt 60 received a sudden impart force greater than the spring force of the spring member 52, the seat belt 60 is forced to pull the bearing device 30 outwards to a predetermined distance (the displacement of such predetermined distance varies with different conditions of use), and the traction cord member 50 carries the roller assembly 40 to rotate along the tracks 20 toward the first ends 22 of the racks 20, causing the roller 41 to roll up the traction cord member 50. When the roller assembly 40 is rotating along the tracks 20, the roller assembly 40 stretches the spring members 52, therefore the roller assembly 40 is working on the spring members 52, i.e., the dynamic energy of the roller assembly 40 induced by the impact force forced on the seat belt 60 is converting into the potential energy of the spring members 52. If the impact force is disappeared from the seat belt 60, the elastic potential energy of the spring members 52 works on the roller assembly 40, causing the roller assembly 40 to move along the racks 20 to the second ends 24 of the roller assembly 40, i.e., to return to the former position.

Figure 7:
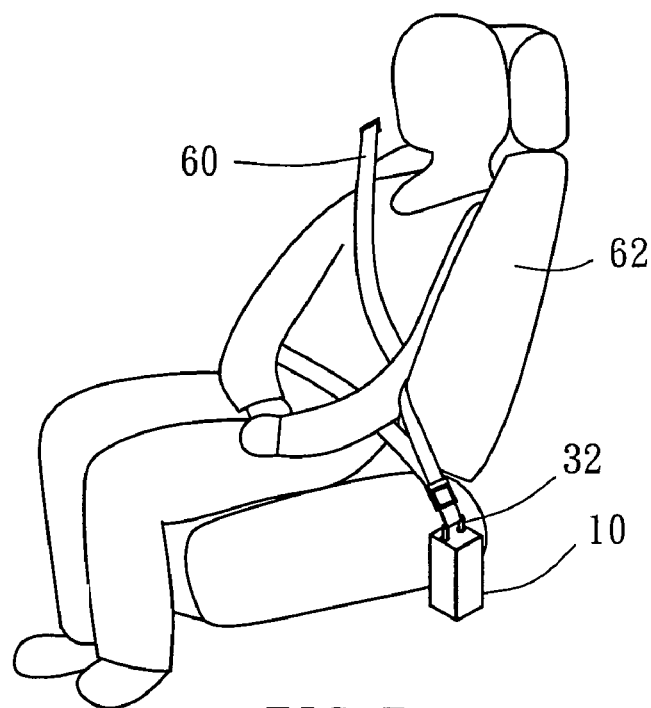
FIG. 7 is a schematic drawing showing an application example of the buffer device according to the present invention.

Referring to FIG. 7, after installation of the housing 10 at one side of the front seat 62 in a motor vehicle, the U-shaped frame 32 is kept in an upwardly extending position and connected to the seat belt 60. If the passenger in the front seat 62 stretches the seat belt 60 transiently due to an accident, the seat belt 60 is forced to move the U-shaped frame 32 of the bearing device 30 through a small distance, thereby causing the traction cord member 50 to drag the roller assembly 40 and the spring members 52, and therefore the energy transferred between the spring members 52 and the roller assembly 40 compensates for a major part of the impact force received by the seat belt 60 to reduce the tension of the seat belt 60. When the traction cord member 50 drives the roller assembly 40 to work and is being rolled up by the roller 41, the seat belt 60 simply makes a minor displacement and keeps securing the passenger in the front seat 62.

Figure 8:
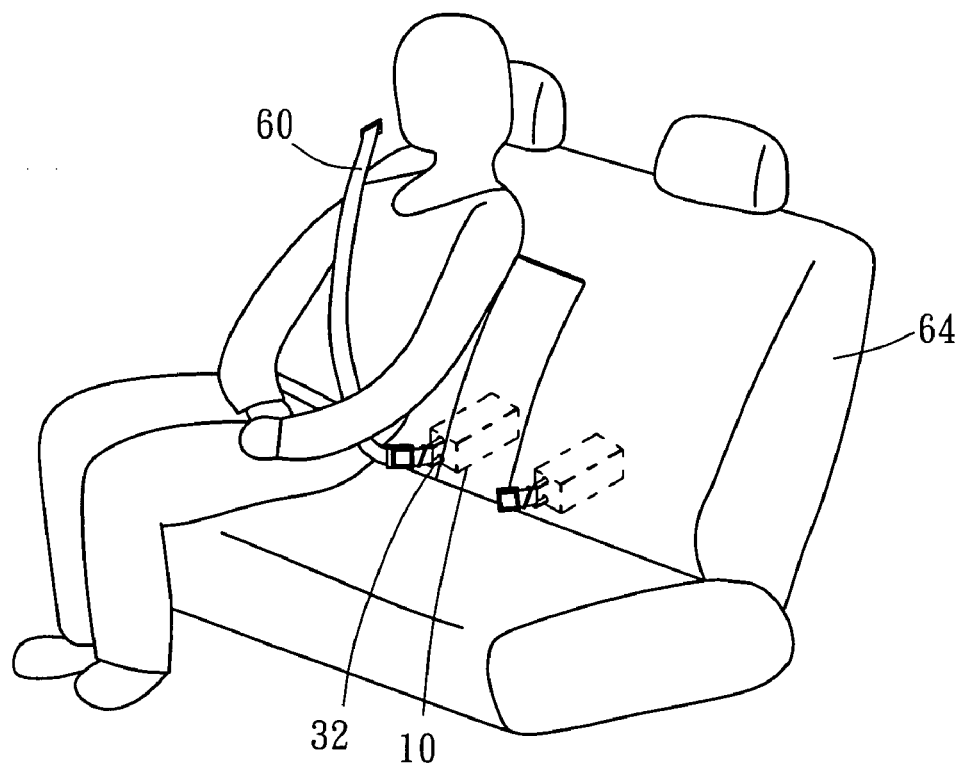
FIG. 8 is a schematic drawing showing another application example of the buffer device according to the present invention.

Referring to FIG. 8, the housing 10 can be installed in a rear seat 64 inside a motor vehicle and connected to the seat belt 60 at the rear seat 64 to protect the passenger in the rear seat 64.

Therefore, the invention buffers any reactive force worked by the seat belt on the passenger, protecting the passenger against injury by the seat belt upon an accident.

In the aforesaid embodiment, the spring member is a tensile spring; however, it can be a variety of spring members such as rubber block, sock absorber, etc. which achieves the same effect as the tensile spring does.

Figure 9:
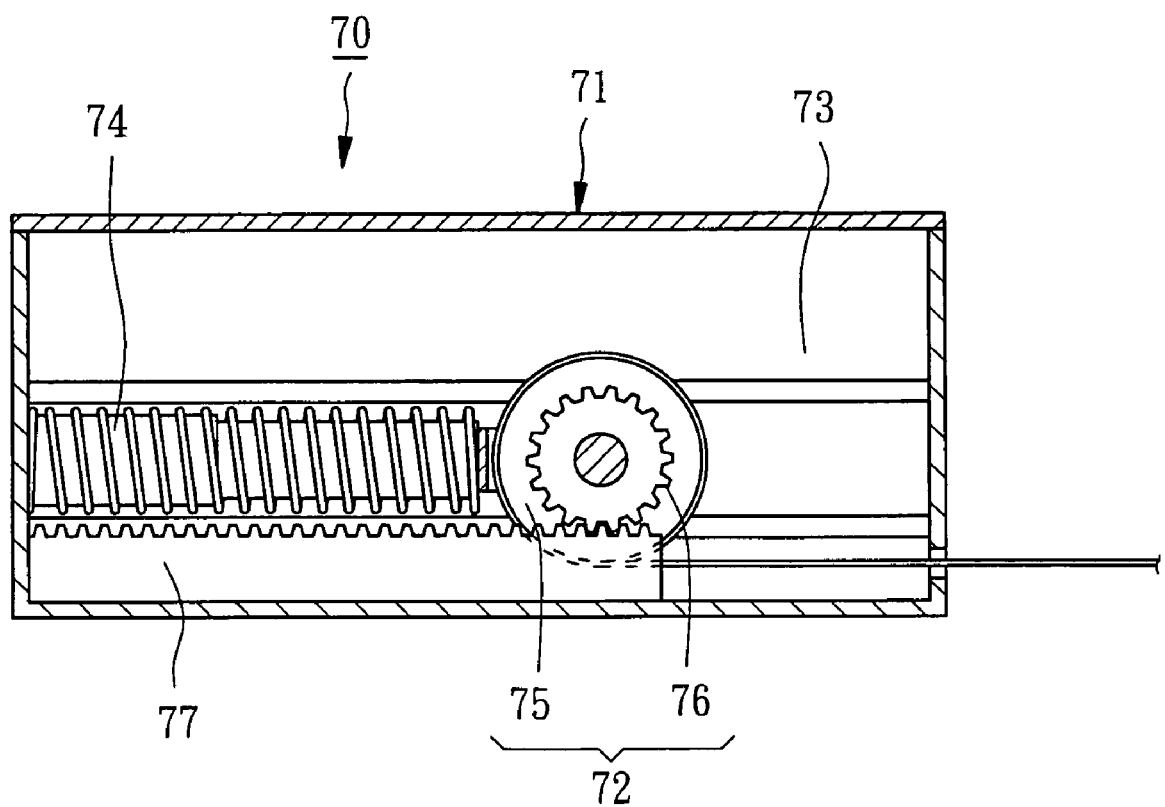
FIG. 9 is a schematic sectional view of an alternate form of the buffer device according to the present invention.

FIG. 9 shows an alternate form of the present invention. According to this embodiment, the buffer device comprises a housing 71, a roller assembly 72, a traction cord member 73, and a spring device 74. The roller 75 of the roller assembly 72 has an outer diameter greater than the outer diameter of the two engagement portions 76 of the roller assembly 72. The traction cord member 73 has one end fastened to the roller 75, and the other end inserted through the housing 71 and connected to the seat belt (not shown). According to this embodiment, the spring device 74 is a shock absorber. When the seat belt is forced to pull the traction cord member 75 upon an impart force, the roller assembly 72 is rotated along the racks 77 to work on the spring device 74, eliminating or reducing the impact force. Therefore, the embodiment also effectively protects the user against injury by the seat belt upon an accident.

What is claimed is:

1. A buffer device used in a motor vehicle and connected to a seat belt in said motor vehicle for buffering said seat belt upon an impact force, the buffer device comprising:
   a housing mounted therein with at least one rack having a first end and a second end;
   a roller assembly having a roller with at least one engagement portion meshed with said at least one rack for guiding rotation of said roller along said at least one rack;
   a traction cord member having an end connected to said roller, said traction cord member is pullable by movement of the seat belt such that when said seat belt is stretched to pull the traction cord member upon an impact force, said roller is forced to rotate along said at least one rack toward the first end of said at least one rack to roll up said traction cord member thereon; and
   a spring member connected between said housing and said roller assembly for pulling said roller assembly toward the second end of said at least one rack.

2. The buffer device as claimed in claim 1, wherein said roller has an outer diameter greater than said engagement portion.

3. The buffer device as claimed in claim 1, wherein said roller has an outer diameter smaller than said engagement portion.

4. The buffer device as claimed in claim 1, further comprising a bearing device movably provided inside said housing and connected to said seat belt; wherein
   the traction cord member passes over the bearing device and has the other end fixed to the housing.

5. The buffer device as claimed in claim 1, wherein said housing has an accommodation chamber accommodating said roller assembly, and at least one sliding groove facing said accommodation chamber and coupled to said roller assembly for guiding movement of said roller assembly in said accommodation chamber.

6. The buffer device as claimed in claim 1, wherein said spring member is a tensile spring.

7. The buffer device as claimed in claim 1, wherein said spring member is a rubber block.

8. The buffer device as claimed in claim 1, wherein said spring member is a shock absorber.

* * * * *